United States Patent [19]
Hutchins et al.

[11] Patent Number: 5,295,128
[45] Date of Patent: Mar. 15, 1994

[54] CLOCK CONTROLLER EMPLOYING A DISCRETE TIME CONTROL LOOP METHOD FOR CLOCKING DATA IN AN ASYNCHRONOUS CHANNEL

[75] Inventors: Robert A. Hutchins, Tucson, Ariz.; Constantin M. Melas, Los Gatos; Pantas Sutardja, San Jose, both of Calif.

[73] Assignee: International Business Machines Corporation, Armonk, N.Y.

[21] Appl. No.: 967,588

[22] Filed: Oct. 28, 1992

[51] Int. Cl.⁵ .......................... H04N 5/76; G11B 5/09
[52] U.S. Cl. ........................................ 369/59; 360/51
[58] Field of Search ................ 369/59; 359/56, 54, 359/104; 340/784; 328/155; 364/724.1; 375/81; 360/10.1, 51, 63, 65, 22, 46

[56] References Cited

U.S. PATENT DOCUMENTS

| | | | |
|---|---|---|---|
| 3,882,540 | 5/1975 | Ottesen | 360/39 |
| 4,215,430 | 7/1980 | Johnson | 375/111 |
| 4,470,082 | 9/1984 | Van Pelt et al. | 360/51 |
| 4,577,240 | 3/1986 | Hedberg et al. | 360/22 |
| 4,797,845 | 1/1989 | Stikvoort | 364/724.1 |
| 4,912,729 | 3/1990 | Van Rens et al. | 375/81 |
| 4,987,373 | 1/1991 | Soo | 328/155 |
| 5,065,263 | 11/1991 | Yoshida et al. | 360/77.03 |
| 5,121,263 | 6/1992 | Kerwin et al. | 360/53 |
| 5,216,554 | 6/1993 | Schneider | 360/51 |

OTHER PUBLICATIONS

"A Survey of Digital Phase Locked Loops" by William C. Lindsey; Reprinted from Proc. IEEE in Apr. 1981.

*Primary Examiner*—Donald Hajec
*Assistant Examiner*—Patrick Wamsley
*Attorney, Agent, or Firm*—Baker, Maxham, Jester & Meador

[57] ABSTRACT

A digital data clock control loop for reconstructing the asynchronous data clock in a recording channel. The Discrete Time Control Loop (DTCL) implementation is suitable for monolithic digital embodiment and uses no analog components, providing stable operation at widely varying clock rates without hardware oscillators. The DTCL also can supply the clocking function to recover synchronous samples in an asynchronous data sampling system.

18 Claims, 7 Drawing Sheets

$T_d = 1/F_d =$ SYNCHRONOUS DATA CLOCK INTERVAL (nsec)
$T_s = 1/F_s =$ SAMPLING CLOCK INTERVAL (nsec)
$T_i = 1/F_i = T_d/T_s =$ NORMALIZED DATA CLOCK INTERVAL
$t =$ PEAK LOCATION WITHIN $T_s$ INTERVAL (nsec)
PKD $= T_s$ INTERVAL DISTANCE BETWEEN PEAKS
PKE $= t/T_s =$ TRANSITION/PEAK PHASE FRACTION
PKN $=$ CUMULATIVE $T_s$ INTERVALS

CLOCK CONTROLLER EMPLOYING A DISCRETE TIME CONTROL LOOP METHOD FOR CLOCKING DATA IN AN ASYNCHRONOUS CHANNEL

BACKGROUND OF THE INVENTION

1. Field of the Invention

This invention relates to a digital data clocking system for asynchronous data transfer and, more specifically, to a recording channel data clock control loop without analog timing elements.

2. Discussion of the Related Art

A magnetic or optical recording channel is designed to accept data for storage and deliver the same on retrieval demand at a later time with reasonable access delay and without errors. Self-clocking modulation codes are employed to ensure an adequate minimum rate of signal transitions for clock synchronization during data retrieval without exceeding the maximum transition storage density of the magnetic or optical medium during data storage. Such modulation codes are run-length-limiting (RLL) codes that represent a one-to-one mapping of binary data into a constrained binary sequence that is then recorded on the recording medium in the form of a modified Non-Return-to-Zero (NRZI) waveform.

In a NRZI waveform, the maximum and minimum number of spaces between consecutive transitions correspond to the maximum and minimum run lengths of zeros between two consecutive ones in the corresponding binary sequence, as is known in the art. Thus, such modulation codes fall within the class of RLL codes characterized by the parameters (d,k) where d represents the minimum and k represents the maximum number of zeros between two consecutive ones in the coded sequence. These codes are the result of a steady evolution of waveform design coupled with improvements in magnetic and optical recording channels, including improved clocking and signal-detection processes.

In a recording channel, the read clocking function is the key to restoring digital data following transition detection. The read clocking function separates the synchronous data clock signal from the self-clocking data signal in the recording channel. It is usually performed by a phase-locked oscillator (PLO), which regenerates the synchronous data clock waveform in response to the flow of self-clocking signal waveform peaks from the magnetic or optical transition detector. Although this phase control loop can be primarily digital, as with a digital phase-locked loop (DPLL), some analog components are necessary. Even in a DPLL, the digitally-controlled oscillator (DCO) employs analog components. Ideally, a digital implementation without analog components is desired because it permits an inexpensive and efficient monolithic device to perform accurate read clocking without calibration drift or adjustment.

Practitioners have suggested progressive improvements to the DPLLs known in the art. A comprehensive survey of the DPLL art is provided by William C. Lindsay et al, "A Survey of Digital Phase-Locked Loops", *Proc. IEEE*, Vol, 69, pp. 410–431, April 1981. These improvements are motivated by the several disadvantages of the analog clock recovery procedures known in the DPLL art. The most obvious disadvantage is that the VCO used to control the clock frequency is an analog component. The analog VCO gain and operating points may depend upon the manufacturing processes. The components may be relatively costly to build and calibrate, thereby offsetting the cost advantage of a digital system implementation. Another disadvantage is the phase error correction delays inherent within a VCO control loop. Tightening the control loop requires tighter restrictions on variations in the input data rate. This may not be feasible in a typical magnetic tape product or in optical data storage systems having variable linear read and write speeds. Moreover, equalization and detector improvements in the recording art may increase the PLL feedback loop delays and exacerbate the problem.

In U.S. Pat. No. 4,987,373, David C. Soo discloses a PLL circuit that uses analog sample detection techniques in his phase detector and the loop filter circuitry in an attempt to avoid some of the difficulties inherent in analog components. However, Soo requires an analog clock generator to drive his sampled-data phase detector circuit.

In U.S. Pat. No. 4,797,845, Eduard F. Stikvoort discloses a PLL coefficient generator for generating deviation signals for use in a sample rate converter with a non-rational sampling ratio. Stikvoort uses synthetic low-rate clock pulses in addition to the normal phase detector clock pulses to make his phase error correction process less subject to the common weaknesses of analog component problems. However, application of his teachings is limited to sample rate converters.

In U.S. Pat. No. 4,912,729, Antonia C. Van Rens et al disclose a DPLL circuit comprising a discrete-time oscillator corrected in phase and frequency to track a sampled input signal. Although their PLL circuit can be constructed entirely by means of digital elements, they use a discrete-time oscillator that drifts rapidly in the absence of frequent input transitions during longer RLL codes, which prevents application of their invention to many useful asynchronous channels.

Thus, despite numerous efforts in the art, there still exists a clearly-felt need for a purely digital implementation of a recording channel clock controller for regenerating and restoring digital data after detection. The related unresolved problems and deficiencies are clearly felt in the art and are solved by this invention in the manner described below.

SUMMARY OF THE INVENTION

This invention is a Discrete Time Control Loop (DTCL) based on a transfer function developed from a new error correction procedure for asynchronous sampling systems. The procedure of this invention is an iterative method for correcting waveform transition phase errors in an asynchronous digital channel.

The waveform transition phase detections can be provided by any useful means known in the art. The Asynchronous Sampling Digital Detector (ASDD) disclosed by C. M. Melas, et al in a copending application entitled "Asynchronous Sampling Digital Detector System For Magnetic And Optical Recording Channels", filed on Oct. 28, 1992 as application Ser. No. 07/967,669, is also a suitable means for supplying these transition detections. The above-cited patent application is included herein in its entirety by this reference.

The procedure of this invention adds a phase error correction consisting of a moving weighted sum of previous phase errors to the phase of the next waveform transition detection. The asynchronous DTCL sampling clock frequency may also be corrected by adding a similar moving weighted sum of previous waveform transition timing errors. The procedure is recursive and entirely digital because it operates on numerical representations of the waveform transition phase detections and the asynchronous sampling clock frequency.

It is an object and an advantage of the apparatus of this invention that it requires no analog components or processes.

It is a feature of the apparatus of this invention that a wide variety of application-specific designs require only simple adjustment of the numbers and weights of the phase errors included in the moving weighted sums used to correct the waveform transition phase and sampling clock frequency.

It is an object of this invention to provide a DTCL embodiment in divisionless form. The modified method of this invention imposes two limited assumptions on the procedure to remove all hardware division operations.

It is an advantage of this invention that the several physical embodiments developed from analytical descriptions of the method of this invention can be implemented on monolithic digital integrated circuits without analog components.

It is an advantageous feature of this invention that the locking range of the asynchronous sampling clock frequency is not limited by analog components. The wide locking range of the DTCL of this invention permits it to be applied to various optical data storage devices. For instance, the DTCL can recover data from a constant-linear velocity optical system disk that is played back on a constant-angular velocity drive. Because of the wide locking range of the DTCL, the continuous change in self-clocking data frequency caused by the linear-angular velocity mismatch can be easily accommodated by the method and apparatus of this invention.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DESCRIPTION OF THE PREFERRED EMBODIMENTS

The DTCL Operation in General

Figure 1:
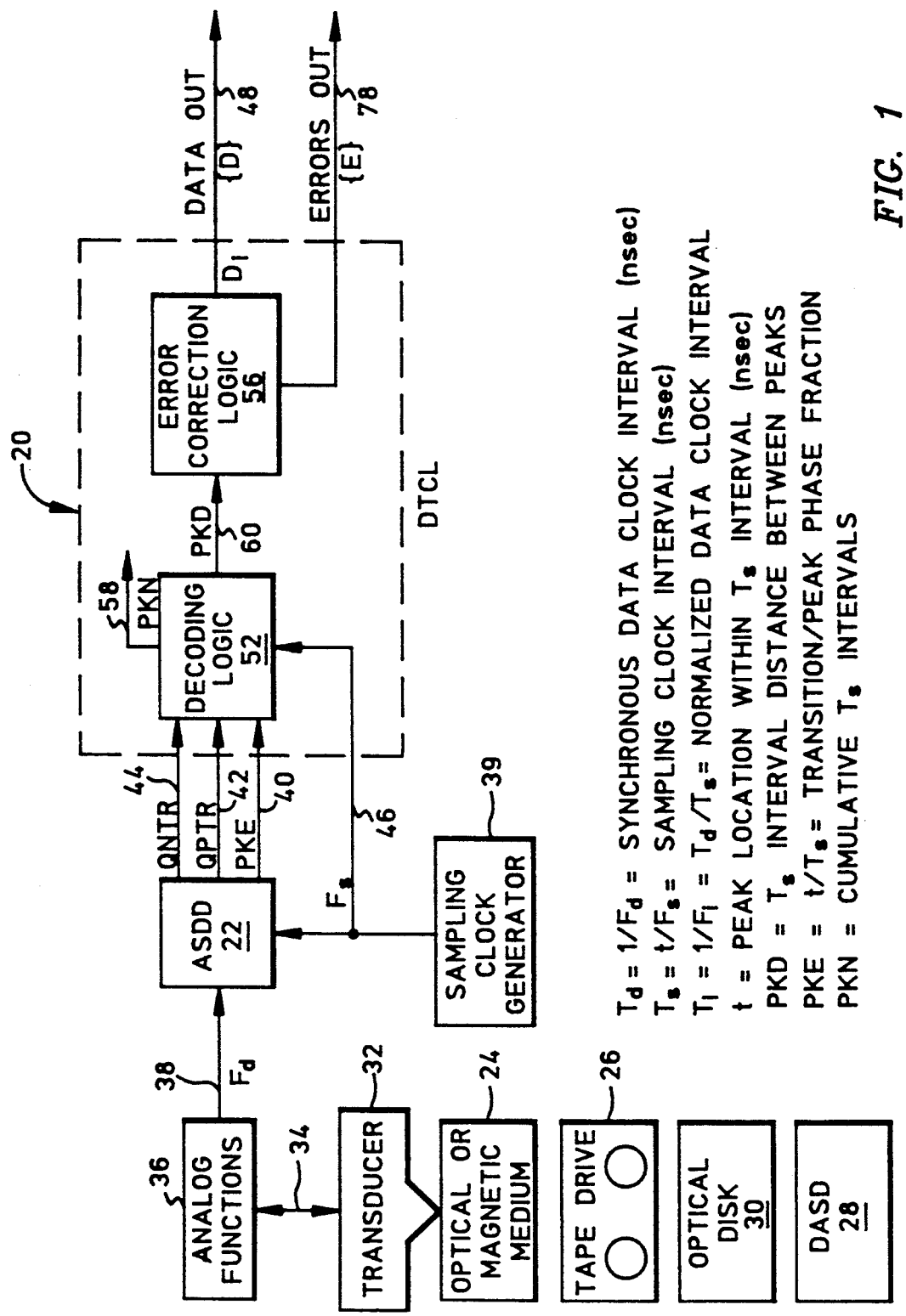
FIG. 1 illustrates the elements of a digital recording read channel.

The DTCL operation can best be explained in the example provided in Table 1. The channel binary information is coded in the positions (phases) of the peaks of the waveform. Thus the data 1 0 0 0 1 0 0 1 0 1, are coded by four peaks (transitions).

The peaks are separated by 4, 3, and 2 synchronous data clock intervals, respectively. The binary data can be represented by the sequence 4, 3, 2. The example assumes that noise or distortion shifts the output of the peak detector to 4.3, 2.4, 2.6. This output can be provided by the ASDD channel disclosed in the above-cited Melas et al reference, or by converting the output from a conventional analog peak detector to digital samples. Because the original data are known to consist of integers, rounding off the peak detector output will give the sequence 4, 2, 3. This yields two errors. The first type of DTCL of this invention (type 1) applies an error correcting factor to each transition detection number before rounding. The second type of DTCL of this invention (type 2) also applies a similar factor to the asynchronous sampling clock period, T.

In Table 1, the initial error E is assumed to be zero. The corrected input $Z_i$ in the first column is therefore equal to the input $PKD_i$. The new error $E_{i+1}$ is computed as the difference between rounded output $N_i$, and $Z_i$. In the last two columns, the error $E_{i-1}$ computed in the previous column is used to correct $PKD_i$ before rounding. This results in correct recovery of the original data for this example.

Table 1 illustrates the operation of a Type 1 DTCL, correcting phase error only. The interval T is the reconstructed data (synchronous) clock interval normalized to the sampling (asynchronous) clock interval. T is assumed to be constant but may vary because of medium speed fluctuations, such as with magnetic tape or linear-angular disk drive speed variations. A second correction may be applied to the interval T, for example, $T_{i+1} = T_i + 0.0625 E_i$. For simplicity of exposition, these corrections are assumed to depend on one previous phase error only. In its most general form, they are the weighted sums of (n) previous errors.

That is, $Z_i = PKD_i + \sum_{j=0}^{n} a_j E_{i-j}$ and, $T_{i+1} = T_i + \sum_{j=0}^{n} b_j E_{i-j}$

TABLE 1

Illustrative Type 1 DTCL
User Written Data: 1 0 0 0 1 0 0 1 0 1 = 4 3 2
Distorted Peak Detector Output: PKD = 4.3 2.4 2.6
Simple clockless detection gives RND (PKD) = 4 2 3
Normalized Data Clock Interval, $T = 1 = T_d/T_s$
Weighting Factors; $a = 0.8$, $b = 0.0625$.

|  | i = 1 | i = 2 | i = 3 |
|---|---|---|---|
| $PKD_i$ | 4.3 | 2.4 | 2.6 |
| $E_{i-1}$ | 0 | .3 | −.36 |
| $Z_i = PKD_i + .8E_{i-1}$ | 4.3 | 2.64 | 2.31 |
| $N_i = RND\ Z_i/T_i$ | 4 | 3 | 2 |
| $E_i = Z_i - N_iT_i$ | .3 | −.36 | .31 |
| $T_{i+1} = T_i + .0625E_i$ | Type 2 DTCL only | | |

Except for Type 1, the two-parameter Type 2 DTCL is the simplest to implement and has been shown to perform well in both tape and disk applications. However, under certain special situations, performance can be improved with additional parameters.

Formal Development of the General DTCL Procedure

The following equations describe the Type 2 version of the DTCL procedure illustrated in Table 1.

$$Z_i = PKD_i + \left( W_1(E_{i-1}) = \sum_{j=1}^{\infty} a_j E_{i-j} \right) \quad \text{(Eqn. 1)}$$

$$N_i = \text{Round}(Z_i/T_i) \quad \text{(Eqn. 2)}$$

$$E_i = Z_i - N_iT_i \quad \text{(Eqn. 3)}$$

$$T_{i+1} = T_i + \left( W_2(E_i) = \sum_{j=0}^{\infty} b_j E_{i-j} \right) \quad \text{(Eqn. 4)}$$

$\{N_i\}$ is the decoded output sequence. $\{E_i\}$ and $\{T_i\}$ are intermediate variables. $W_1$ and $W_2$ are linear weighted sums of all past values of $E_i$. The Type 1 DTCL algorithm sets $T_{i+1} = T_i$ by setting $W_2(E_i) = 0$.

Two-Parameter DTCL Formula: Eqns. 1, 3 and 4 form a linear system of equations and thus can be expressed using Z-transforms. Eqn. 2 is nonlinear, but can be ignored if the decoded output sequence $\{N\}$ is error free and made up of the same integer N. Thus, a transfer function relating the output $\{E\}$ and the input $\{PKD\}$ can be obtained. As is well-known, $z^{-1}$ represents a time delay of N clock intervals, the time interval required for each PKD detection.

For the two-element embodiment of this invention, only $a_1$ and $b_0$ are nonzero.

Thus, $$0 < a_1 < 1;\quad a_j = 0\ \text{for}\ j \neq 1 \quad \text{(Eqn. 5)}$$

and $$0 < b_0 < 1;\quad b_j = 0,\ j > 0 \quad \text{(Eqn. 6)}$$

$$E(z) = \frac{(1 - z^{-1})^2 PKD(z)}{(1 - (1 - a_1 - Nb_0)z^{-1} + a_1z^{-2})} \quad \text{(Eqn. 7)}$$

Figure 3:
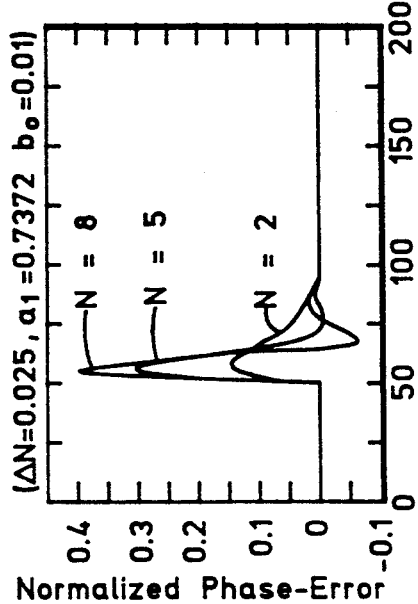
FIG. 3 shows the measured response of the two-parameter DTCL of this invention to a stepped media velocity.
Figure 5:
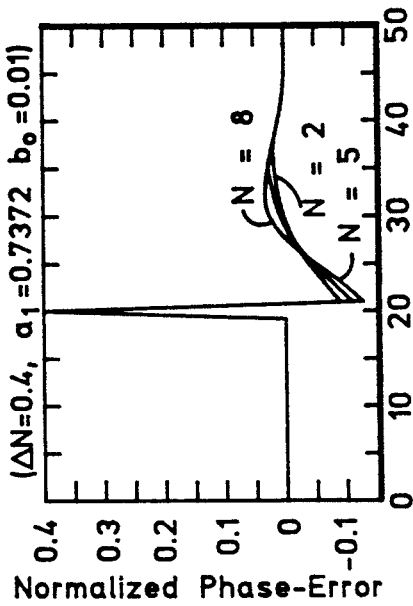
FIG. 5 shows the measured impulse response of the two-parameter DTCL of this invention for fixed input sequences having a single sequential pair of upward and downward steps corresponding to a shift in a single peak position.
Figure 2:
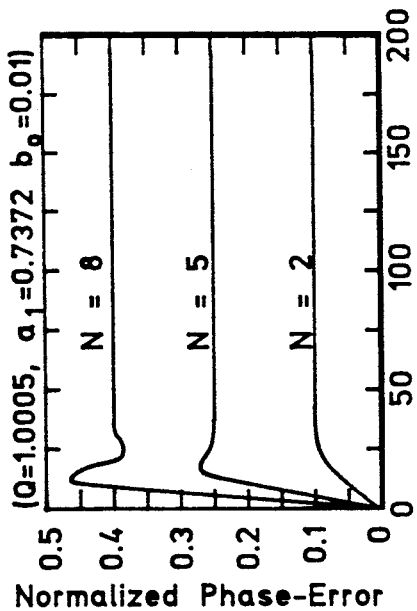
FIG. 2 shows the measured response of a two-parameter Discrete Time Control Loop (DTCL) of this invention to a constant media acceleration.
Figure 4:
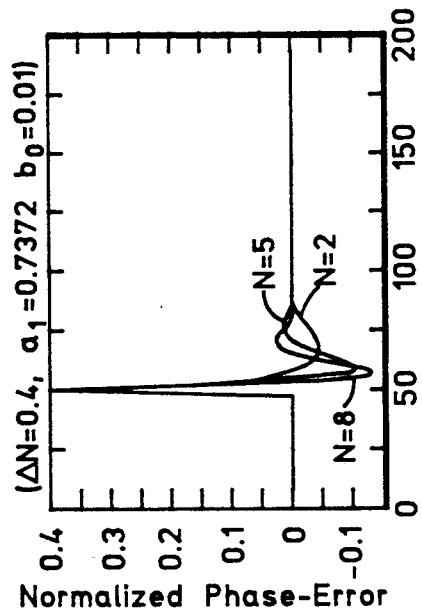
FIG. 4 shows the measured impulse response of the two-parameter DTCL of this invention for fixed input sequences having a single upward step.

Recall that the unit delay $z^{-1}$ above is equal to N clock periods. FIGS. 2 to 5 show transient responses of a two-parameter DTCL, using $a_i = 0.7372$ and $b_0 = 0.01$. The inventors computed the transient responses directly from the above DTCL formula. FIG. 2 shows the effect of constant recording medium acceleration. FIG. 3 shows the effect of a rapid step in recording medium velocity. FIGS. 4–5 illustrate the effects of cell-shifts in peak detection such as may arise from noise.

Three-Parameter DTCL Formula

A similar three-parameter DTCL embodiment is also useful. The b factor is made nonzero, adding a third parameter, but $b_1$ is limited to a function of the remaining two parameters. Thus:

$$0 < a_1 < 1;\quad a_j = 0\ \text{for}\ j \neq 1 \quad \text{(Eqn. 8)}$$

and $$0 < b_0 < 1;\quad b_1 = -b_0a_1;\quad b_j = 0\ \text{for}\ j > 1 \quad \text{(Eqn. 9)}$$

The parameter $b_1$ is dependent on the other two. Eqn. 4 is rewritten as $$T_{i+1} = T_i + b_0(PKD_i - N_iT_i) \quad \text{(Eqn. 10)}$$

to eliminate $b_1$ altogether. The transfer function of this three-parameter formula is given by $$E(z) = \frac{(1 - z^{-1})PKD(z)}{(1 - a_1z^{-1})(1 - (1 - Nb_0(1 - a_1))z^{-1})} \quad \text{(Eqn. 11)}$$

An interesting feature of Eqn. 11 is that the poles of this transfer function are always real. Thus, the transient response is never underdamped.

Modified (Divisionless) DTCL Algorithm: The inventors have developed an alternate formula that uses only addition, subtraction and multiplication operations. This is more suitable for high-speed monolithic digital implementation. The division operation is eliminated from Eqn. 2 by normalizing each received signal PKD to the corresponding $T_i = T_d/T_s$. The following formula results:

$$PKD'_i = PKD_i/T_i \quad \text{(Eqn. 12)}$$

$$Z'_i = PKD'_i + W_1(E'_{i-1}) \quad \text{(Eqn. 13)}$$

$$N_i = \text{Round}(Z'_i) \quad \text{(Eqn. 14)}$$

$$E'_i = Z'_i - N_i \quad \text{(Eqn. 15)}$$

$$E_i = T_iE'_i \quad \text{(Eqn. 16)}$$

$$T_{i+1} = T_i + \left( W_2(E_i) = \sum_{j=0}^{\infty} b_jT_{i-j}E'_{i-j} \right) \quad \text{(Eqn. 17)}$$

In the above, the prime mark indicates that the variable is normalized to $T_i$ because the normalized $PKD_i$ is used in the computation. The un-normalized version of $E_i$ is recreated to keep Eqn. 17 compatible with Eqn. 4.

There remains a division operation in Eqn. 12, that can be eliminated with variable substitution. To eliminate it, a new variable is first defined as $F_i = 1/T_i$. Eqn. 12 is then rewritten as:

$$PKD'_i = PKD_iF_i \quad \text{(Eqn. 18)}$$

Secondly, an approximation is applied to permit direct calculation of $F_i$:

$$F_{i+1} = 1/T_{i+1} = \frac{1}{T_i + W_2(E_i)} =$$

-continued $$\frac{1}{T_i} \frac{1}{1 + W_2(E_i)/T_i} \approx F_i(1 - F_i W_2(E_i))$$

This leads to:

$$F_{i+1} = F_i - F_i^2 W_2(E_i) \qquad \text{(Eqn. 19)}$$

Inspection Eqns. 16 and 19 shown that $F_i$ has not yet completely replaced $T_i$ in the formula. A second approximation is applied to complete this process:

$$F_{i+1} \approx F_i - F_i W_2(E_i')$$

In this approximation, the normalized residue is used to compute the weighted sum. At the same time, the weighted sum multiplier is reduced from $F_i^2$ to a single power of $F_i$, eliminating division. This merely assumes that the ratio of $T_{i-j}$ and $T_i$ is approximately unity for all non-negative integers $\{j\}$, or in the special case where only $b_0$ is non-zero, a less stringent requirement that the ratio of $T_{i-1}$ and $T_i$ is approximately unity, which is reasonable for low-speed variations in self-clocked data rate. The last approximation leads to the following divisionless procedure:

$$Z_i' = (PKD_i' = F_i PKD_i) + W_1(E_{i-1}') \qquad \text{(Eqn. 20)}$$

$$N_i = \text{Round}(Z_i') \qquad \text{(Eqn. 21)}$$

$$E_i' = Z_i' - N_i \qquad \text{(Eqn. 22)}$$

$$F_{i+1} = F_i - F_i W_2(E_i') \qquad \text{(Eqn. 23)}$$

The z-transform analysis method cannot be used on this modified divisionless procedure because the system is non-linear even when $N_i = N$ for all $\{i\}$. However, the inventors have shown through direct numerical simulation of the transient responses that the modified DTCL procedure behaves closely to the general DTCL procedure. For example, a set of transient responses similar to those shown in FIGS. 2 to 5 can be made for the divisionless DTCL using the same parameter values. A maximum difference of less that 1% phase-error was noted between the general and the modified DTCL in all the transient responses tested.

Further approximation can be made by replacing $F_i$ with a constant value $F_0$ that may then be multiplied by $b_0$ to form a single constant weighting factor. This simplified divisionless DTCL behaves closely to the general DTCL so long as $F_i$ remains substantially constant; that is, when the ratio of the actual synchronous data clocking frequency and the asynchronous sampling frequency remains fairly constant.

DTCL Implementation

FIG. 1 shows the elements of a typical digital data recording channel. The Discrete Time Control Loop (DTCL) 20 of this invention is shown within the recording channel, which also includes the Asynchronous Sampling Digital Detector (ASDD) 22 disclosed in the above-cited Melas et al reference. FIG. 1 shows the relationship between these two elements and the optical or magnetic data storage medium 24. Medium 24 may be the linear tape in a multi-track tape drive 26, which varies widely in speed from startup to operating velocity. Medium 24 may also include the magnetic disk surface within a Direct Access Storage Device 28, which offers much more stable velocity. Moreover, medium 24 may be an optical disk surface in an optical disk data device 30 of the type known in the art.

Magnetic or optical transitions in medium 24 are sensed by a transducer 32 in any useful manner known in the art. The transducer output signal 34 is presented to the usual plurality of analog functions 36. These functions include preamplification, Automatic Gain Control (AGC), and anti-aliasing (low-pass) filtering. The resultant analog data signal waveform 38 is presented to ASDD 22 for data detection.

Although FIG. 1 shows ASDD 22 as the means for detecting waveform transition times and creating a series of digital words describing these transition times, any suitable means known in the art may also be used to provide the digital inputs required by DTCL 20 of this invention.

An important feature of this invention is the unrestricted asynchronous sampling rate $F_s = 1/T_s$. For high-speed operation, $F_s$ should be made as low as possible. The synchronous data clock rate $F_d$ is set by design but permitted to vary by several percentage points about the nominal design value to account for component and manufacturing variances. The asynchronous sampling clock rate $F_s$ is set by design to be proportional to the nominal synchronous data clock rate $F_d$. That is, the ratio $F_i(\text{nominal}) = F_d(\text{nominal})/F_s$ is set by design to a fixed value. The precise value of $F_i$ is then calculated within DTCL 20.

The sampling clock $F_s$ comes from an independent sampling clock generator 39, whose frequency is set only by the microcontroller of the drive (not shown). The $F_s$ clock line 46 is the only temporal clock line in the entire detector. The synchronous data clock frequency $F_d$ is never actually generated by DTCL 20. $F_d$ is known only implicitly from the calculated ratio $F_i = F_d/F_s$, which is a digital word held in one of the registers in DTCL 20.

The digital inputs required for DTCL 20 are shown in FIG. 1 as PKE, QNTR, and QPTR. PKE is the digital representation of the fractional clock interval at which a waveform transition is detected. QNTR and QPTR are two flags that signal the presence or absence of a transition within the present sampling clock interval $T_s$. For PWM detection, QNTR flags all qualified negative-going threshold transitions and QPTR flags all qualified positive-going threshold transitions. For peak detection, QNTR flags qualified positive peaks and QNTR flags qualified negative peaks.

Internally, DTCL 20 first converts the information carried on PKE bus 40, QNTR line 44 and QPTR line 42 to $\{PKD\}$ on the PKD bus 60. $PKD_i$ is the digital count of the number of sampling clock periods $T_s$ between the most recent waveform transition detection and the present waveform transition detection. In FIG. 1, this conversion occurs schematically in a decoding logic 52.

The outputs from DTCL 20 include the digital data $\{D\}$ on a data output bus 48 indicating the number of data clock periods $T_d$ between the most recent transition detection and the present transition detection. Also, the phase-error values $\{E'\}$ are provided at an error output bus 78. These phase-error values $\{E'\}$ can be used within ASDD 22 to provide additional detection improvement, as described in an example in the above-cited copending Melas et al patent application.

Decoding logic 52 merely combines the two flags on lines 42 and 44 with the series of $PKE_i$ digital words to produce the differential pulse location words $PKD_i$ on bus 60. To appreciate this process, consider the example discussed above in connection with Table 1, assuming $T_s$ is substantially equal to $T_d$. The PKE signal on bus 40 would be $x_1$ 0 0 0 $x_2$ 0 0 $x_3$ 0 $x_4$, representing the user-written NRZI data 1 0 0 0 1 0 0 1 0 1. In this example, $\{x_i\}$ (i=1, 2, 3, 4) represent the fractions of the current sampling interval $T_s$ at which the peak or transition detection occurs. Decoding logic 52 performs the calculations $(1-x_i)+2+x_2$ to generate $PKD_1$, $(1-x_2)+2+x_3$ to generate $PKD_2$ and $(1-x_3)+1+x_4$ to generate $PKD_3$. In Table 1, $PKD_1=4.3$, $PKD_2=2.4$ and $PKD_3=2.6$.

The error correction logic 56 is the essential element of DTCL 20, converting the {PKD} values into digital data {D} on bus 48 as each becomes available. Thus, logic 56 is driven by PKD events instead of the sampling clock frequency $F_s$. Each digital datum $D_i$ represents the number of synchronous data clock intervals $T_d$ between a consecutive signal transition pair recovered from medium 24. Data {D} can be considered to be the final output of DTCL 20. If a NRZI output is desired, each digital datum $D_i$ can be later converted to a bit stream having $D_i-1$ zeros followed by a 1.

Figure 6:
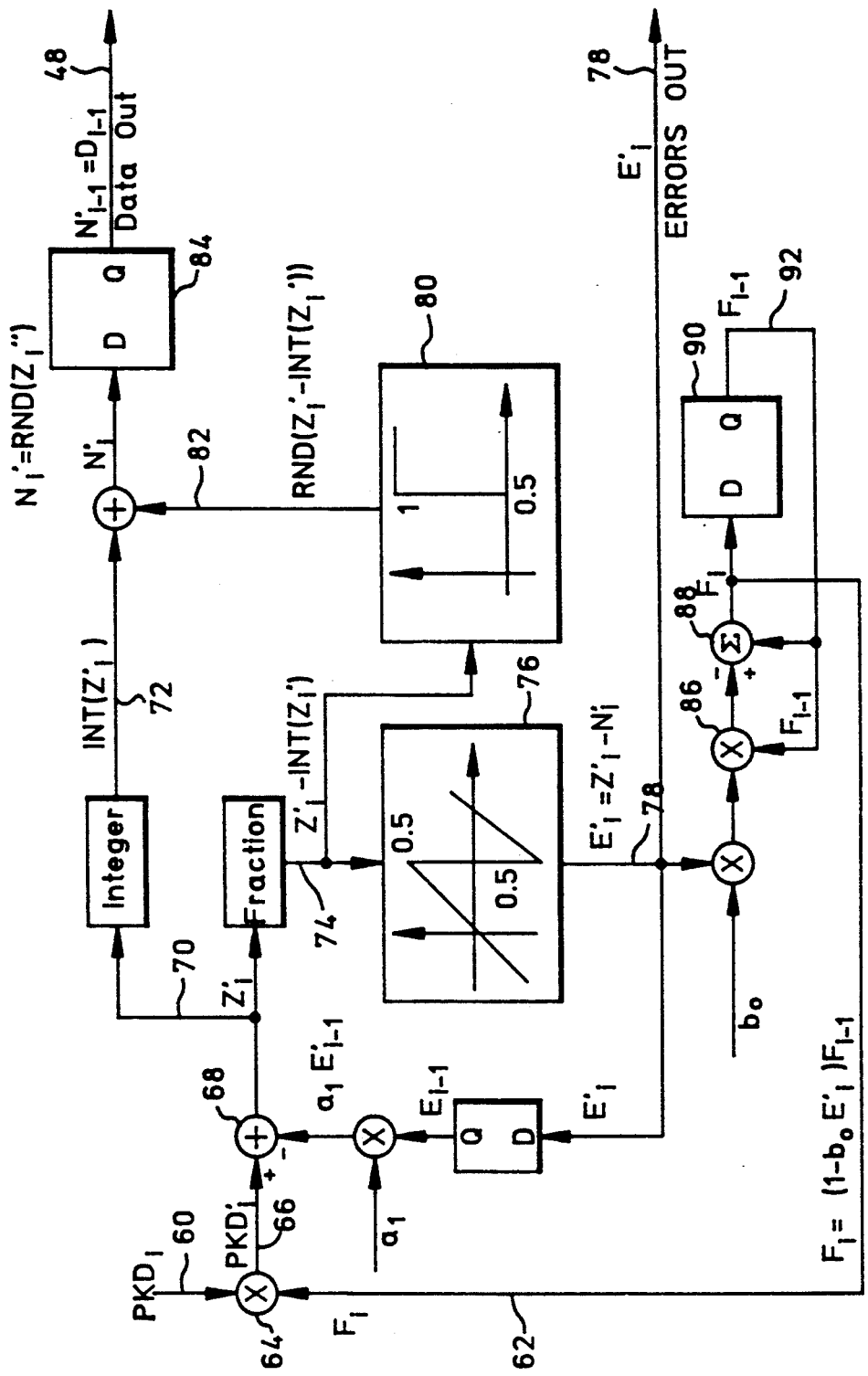
FIG. 6 shows a block diagram of an illustrative direct implementation of the divisionless two-parameter DTCL of this invention.

Direct implementation of the logic 56 portion of the modified DTCL procedure is straightforward. FIG. 6 shows the block diagram equivalent of the 2-parameter (Eqns. 5 and 6) modified DTCL procedure described in Eqns. 20-23. The symbols and forms are well-known in the discrete-time system arts. The DTCL correction and decoding procedure is driven by the occurrence of new events, that is, new $PKD_i$ inputs. For the highest possible hardware speed, it may be necessary to limit the number of arithmetic operations in a register-to-register data path. This is normally done by pipelining the arithmetic operations in a manner known in the art.

In FIG. 6, the {PKD} inputs are received on bus 60. The {D} outputs are provided on bus 48. The normalized phase or timing errors {E'} are output on bus 78. The remaining buses are internal to the DTCL operation. The operation of the circuit in FIG. 6 can be best understood with reference to Eqns. 20-23. A multiplier 64 combines $PKD_i$ with $F_i$ to produce the normalized peak detection $PKD_i'$ on bus 66. $PKD_i'$ is adjusted for a weighted error $(a_1E_{i-1}')$ at a summing device 68 to produce the adjusted peak detection $Z_i'$ on bus 70. The digital word representing $Z_i'$ on bus 70 contains integer and fractional parts. The integer portion is separated out onto bus 72 as $INT(Z_i')$ and the fractional remainder on bus 74 as $(Z_i'-INT(Z_i'))$.

The fractional remainder is then processed in a combination logic 76 to create the rounded fraction minus the fractional remainder. This results in the normalized timing error $E_i'$ on error bus 78. Similarly, the fractional remainder on bus 74 is simply rounded in a logic 80 to create the rounded value of 0 or 1 on the bus 82. This rounded number is summed with $INT(Z_i')$ on bus 72 to create the rounded corrected normalized waveform transition detection time $N_i'=RND(Z_i')$. A register 84 delays this digital word $N_i'$ by one PKD event to give the $D_i$ output.

Similarly, a multiplier 86 combines the previous value for the normalized data clock frequency $F_{i-1}$ with a weighted error $(b_0E_i')$ and a summing device 88 combines this with $F_{i-1}$ to create $F_i$, which is the value of the normalized data clock frequency needed for the next PKD interval. A register 90 delays the new value $F_i$ by one PKD event so it becomes the old value $F_{i-1}$ on the bus 92 for the next PKD event.

Figure 7:
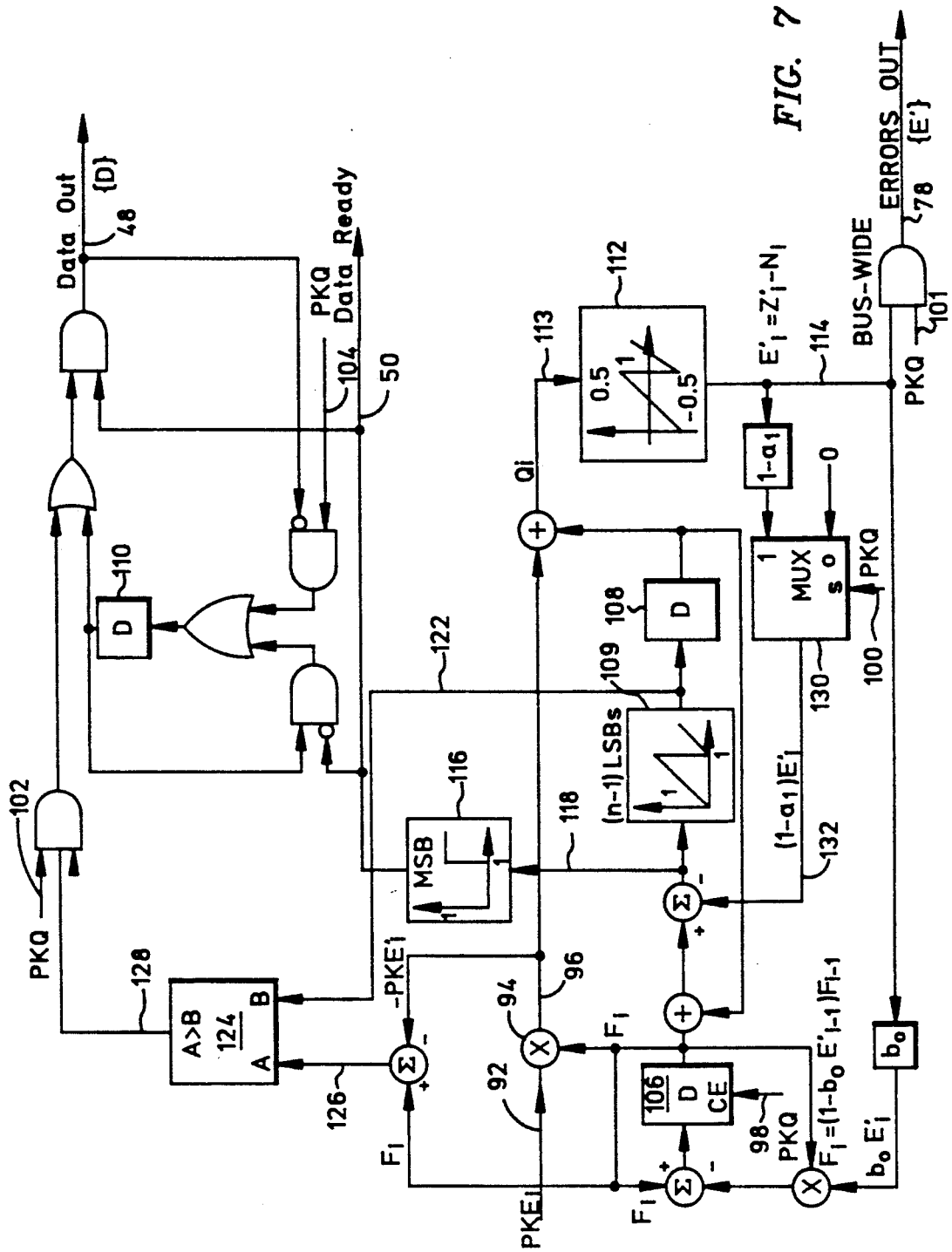
FIG. 7 shows a block diagram of an illustrative implementation of the divisionless two-parameter DTCL of this invention configured to operate directly with ASDD input signals.

The 2-parameter modified DTCL procedure may also be implemented in an implicit manner, which the inventors prefer. The outputs discussed above for Asynchronous Sampling Digital Detector (ASDD) 22 in FIG. 1 describe the peak positions of a series of qualified data pulses or transitions. The two flag outputs on lines 42 and 44 can be combined to form a single PKQ signal (FIG. 7). PKQ is a logical flag that is asserted over any asynchronous sampling clock interval in which a qualified transition or peak is located. The output PKE on data bus 40 indicates the relative temporal position of a transition or peak within an asynchronous interval. With these ASDD detection outputs, two different approaches are useful for performing data clock recovery and data detection.

The first approach converts the peak position information into peak-to-peak distance (PKD) information. Data detection is then performed using the direct implementation of the DTCL procedure discussed above in connection with FIG. 6. This approach is hampered by the large register and bus size required for the large PKD values that will arise because of large code run lengths.

The second approach uses the PKQ and PKE signals directly. In essence it merges "decoding" logic 52 into "correction" logic 56. The idea it to limit PKD size. An example of such an implementation is given in FIG. 7. This two-parameter implicit implementation of the modified or divisionless DTCL procedure required extensive experimentation by the inventors, who were obliged to make the tests discussed below to verify that this particular implicit implementation is equivalent to the explicit implementation discussed above in connection with FIG. 6.

The PKQ flag operates as an enablement signal, permitting updates to certain parts of the circuitry only upon occurrence of a new signal transition event PKD. These PKQ inputs are shown in five locations labelled 98, 100, 101, 102 and 104 in FIG. 7. A register 108 forms the accumulator of an implicit PKD' counter. A truncation logic 109 acts to prevent register 108 from holding a number greater than or equal to 1.0 by passing only fractional values. This is done merely by passing all Least Significant Bits (LSBs) and setting the output Most Significant Bit (MSB) to zero. The combinatorial logic 116 signals the expiration of one synchronous data clock period $T_d$ when the number on the bus 118 exceeds or equals 1.0. This is accomplished merely by passing the MSB from bus 118 onto line 50.

After summing with the normalized PKE value on bus 96, the output of register 108 gives a value $Q_i$, which provides the timing or phase-error value $E_i'$ on the bus 114 when $Q_i$ is passed through the combinatorial logic 112 upon PKQ=enable. This $Q_i$ value differs from the $Z_i'$ value used in the direct implementation (FIG. 6) by some integral number+0.5. Combinatorial logic 112 converts $Q_i$ merely by inverting the second MSB of the bus 113, replicating it into the MSB, and passing the two modified MSBs together with the other unmodified LSBs onto bus 114 as $E_i'$.

The phase error value $E_i'$ on bus 114 is multiplied with $b_0$ and $F_i-1$ to generate the new value $F_{i+1}$ in much the same way as is discussed above in connection with FIG. 6. However, because the phase-error value $E_i'$ is valid only when the enabling PKQ flag is asserted, register 106 is updated only when enabled by PKQ on line 98. Thus, the $F_i$ value is updated only by an equivalent PKD event.

A multiplexer 130 is also used to pass valid values of the normalized phase error $E_i'$ after multiplication by a constant $(1-a_1)$. Multiplexer 130 is part of the implicit PKD' counter loop.

The logic gates associated with data ready line 50 together with the comparator 124 form a NRZI data decoder for this DTCL implementation. Output data {D} on bus 48 are a stream of NRZI zeros and ones, which are not necessarily valid in all asynchronous clock intervals. A valid NRZI data bit is present on line 48 only when the Data Ready line 50 is high.

Figure 8:
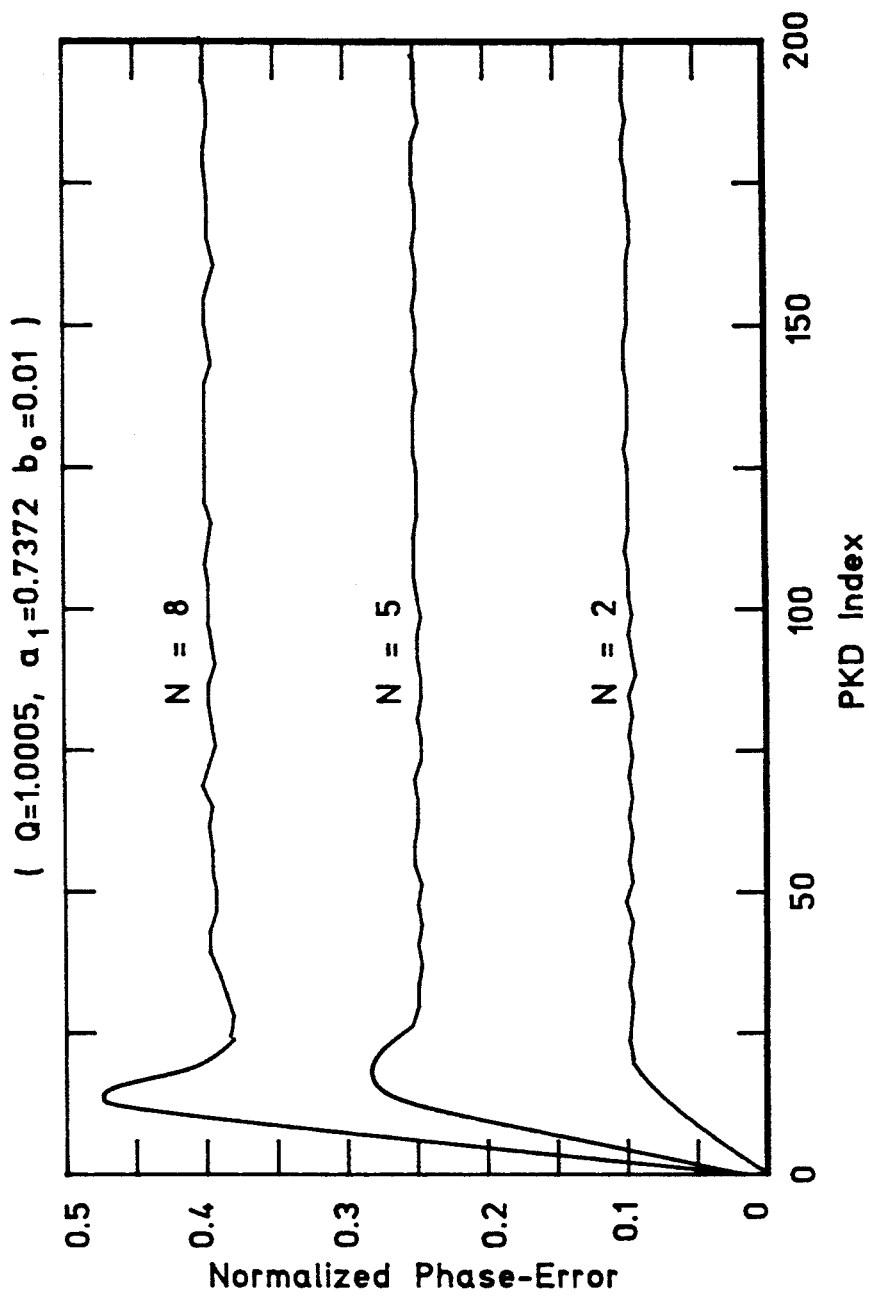
FIG. 8 shows the acceleration response of the illustrative DTCL implementation from FIG. 8.

This implicit implementation (FIG. 7) does not yield exactly the same behavior as the direct implementation (FIG. 6) because the update to the normalized synchronous data clock frequency $F_i$ occurs on the asynchronous sampling clock interval boundaries instead of the equivalent peak boundaries where it occurs in the direct implementation of FIG. 6. However, exact numerical computations show that the transient responses for the implicit implementation using parameter values given in FIGS. 2 to 5 deviate in phase from the exact results in FIGS. 2 thru 5 by no more that 1%. The only obvious qualitative difference occurs in the acceleration response (FIG. 8), where the slight wiggles of less than 1% phase error result from updating the normalized data clock frequency $F_i$ on the asynchronous clock boundary instead of the equivalent $PKD_i$ boundary. The example shown in FIG. 8 uses an asynchronous clock frequency that is nominally two times the expected data (synchronous) clock frequency, but the implementation in FIG. 7 will perform adequately with any oversampling rate greater than unity.

DTCL Performance Evaluation

Figure 9:
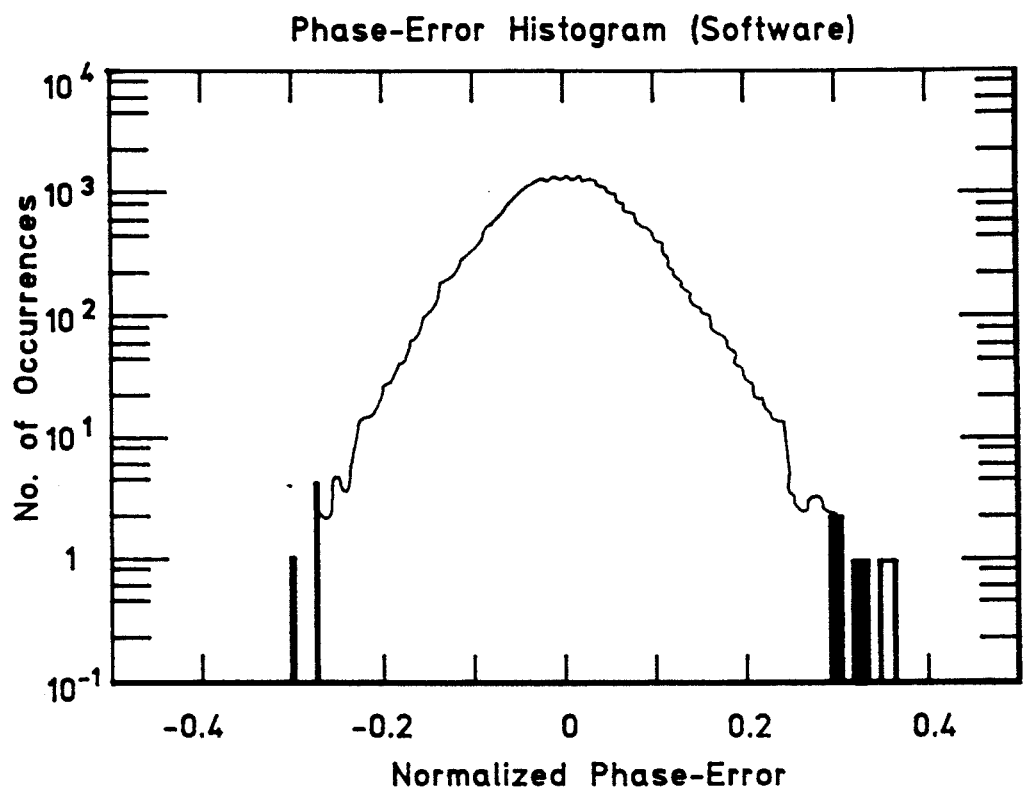
FIG. 9 shows the calculated phase errors of a one-parameter DTCL of this invention.

The inventors have evaluated DTCL performance using a software model of an Asynchronous Sampling Digital Detector (ASDD) on a read-back data signal from a test stand using a Kazuza II disk and a TDK MIG head. FIG. 9 shows the phase error distribution of the peaks in the read-back signal of a pseudo-random RLL (1,7) code.

Figure 10:
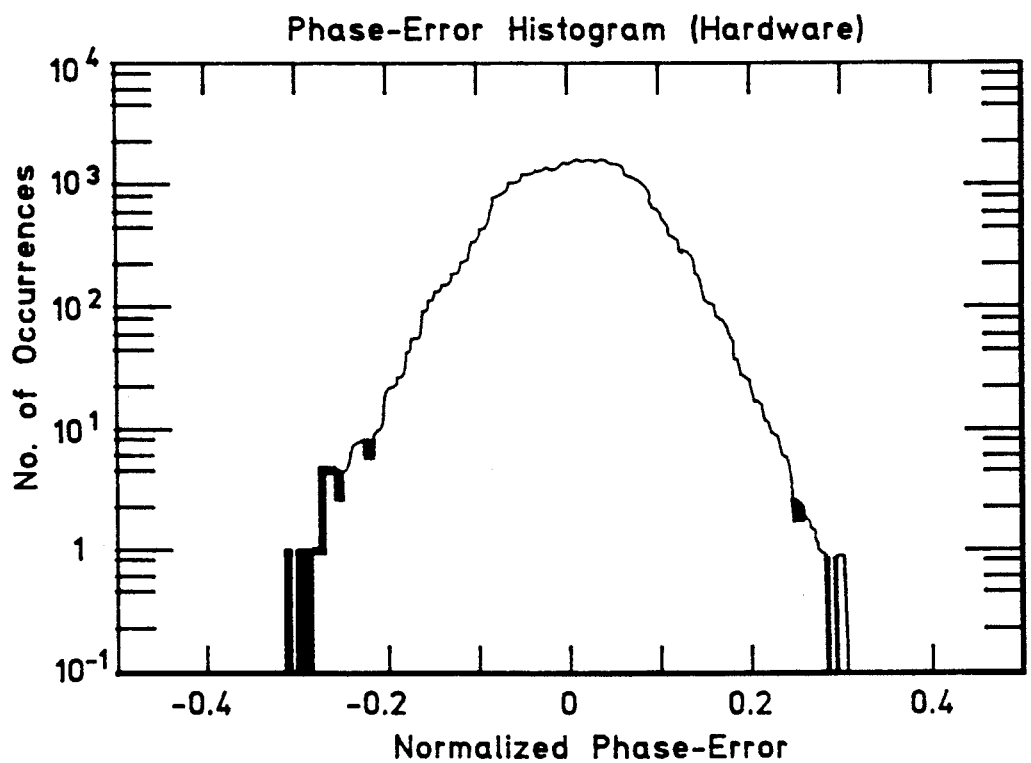
FIG. 10 shows the phase errors measured using a hardware prototype of a one-parameter DTCL of this invention.

The inventors also fabricated a hardware prototype of an ASDD channel coupled to a type 1 DTCL. FIG. 10 shows the prototype phase-error distribution compiled from measurements of the phase-error at the prototype output. FIGS. 9 and 10 show similar results. The differences result from the 11-bit integer arithmetic used in the hardware prototype instead of the 32-bit floating point arithmetic used in the software channel simulation. There were no errors in the decoding of the read-back signal in either case.

Application to DTCL in Sampled Detection Systems

In a sampled detection system, the data is contained in samples of a waveform function. This requires synchronous sampling at the correct phase within the bit period. The DTCL of this invention can be used with the ASDD in FIG. 1 to provide these sampling points. When initial sampling of the waveform is asynchronous, the distance between an asynchronous sample and the nearest synchronous sampling point must be determined. The amplitude at that synchronous sampling point is then found by interpolation. Because of the features available in the ASDD and DTCL, this interpolation will succeed even with intervening extrema in the waveform.

For example, assume that some synchronous sampling points occur at waveform peaks. The ASDD operates to determine the distance between a signal peak and the nearest asynchronous sample, and also finds the distance PKD between consecutive zero-crossings, which is then provided to the DTCL. The DTCL intermediate phase error E is merely the distance between a synchronous sampling point and the closest zero-crossing, PKE. Thus, distance between asynchronous samples and synchronous sampling points can be derived as E-PKE.

Figure 11:
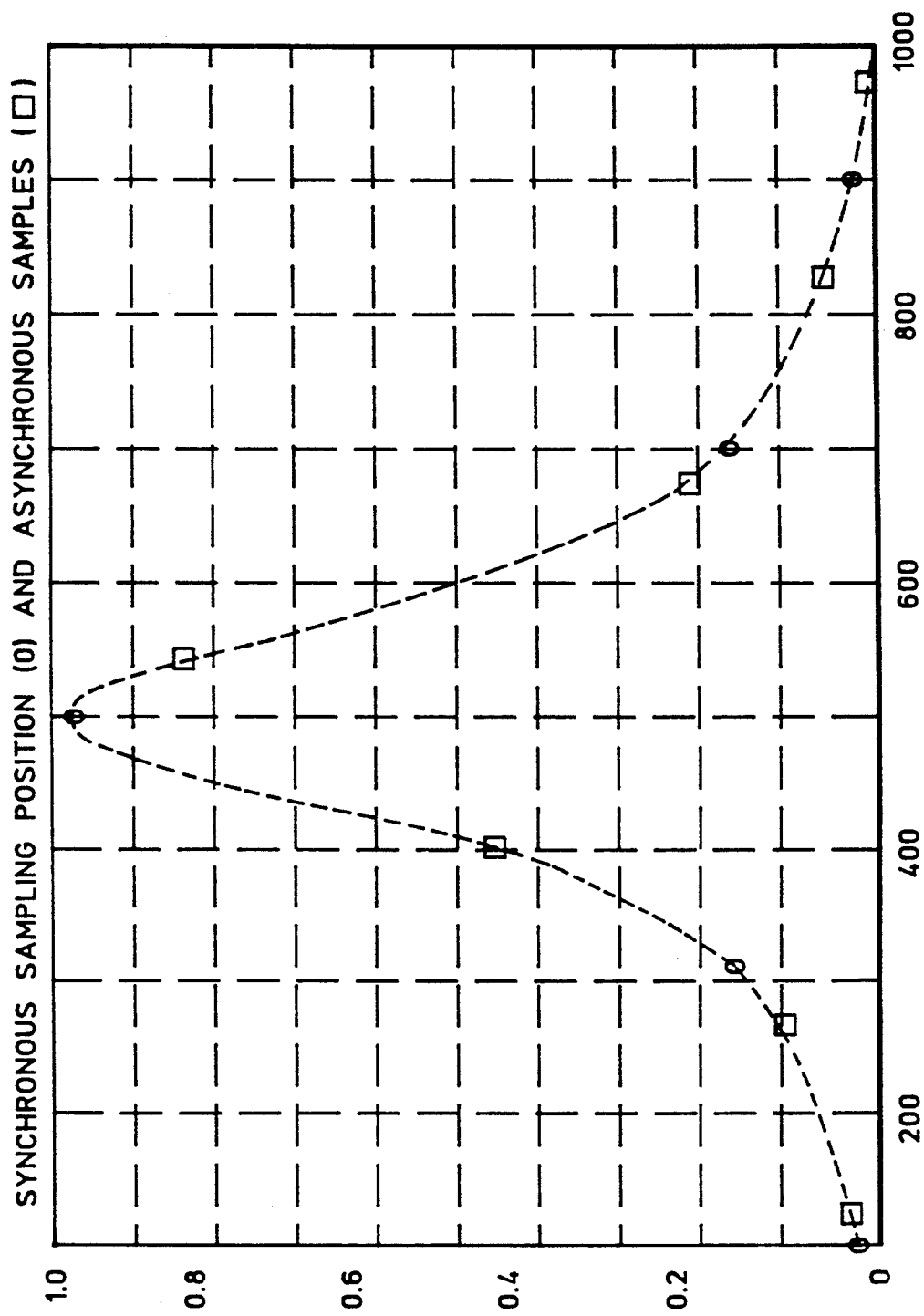
FIG. 11 illustrates the exemplary application of the DTCL of this invention to asynchronous determination of synchronous samples of a signal waveform.

FIG. 11 shows a waveform function with asynchronous samples (squares) and synchronous positions (circles). In this example, E=0 and the distance PKE is 39 from the peak at 500 to the nearest sample at 539. Synchronous sampling positions are the peaks (or derivative zero-crossings) at 100, 300, 500, 700 and 900. Knowing PKE and $F_i$, which is the ratio of synchronous sampling frequency to asynchronous sampling frequency, the amplitude of the waveform function at the synchronous sampling positions can be estimated by ASDD interpolation.

Clearly other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In a Direct Access Storage Device (DASD) having a recording channel for recovering data (D) stored as a plurality of signal transitions in said DASD, an asynchronous discrete clock controller having an asynchronous sampling clock frequency $F_s$, where a normalized clock frequency $F_i$ is defined as the ratio of a synchronous data clock frequency $F_d$ to said sampling clock frequency $F_s$, where i is a non-zero positive integer and $0 \leq a, b \leq 1$, said clock controller comprising:

output bus means for delivering said recovered data (D);

input means for receiving a first digital word representing the detection time $P_i$ of an $i^{th}$ said signal transition;

first multiplier means coupled to said input means for multiplying said first digital word $P_i$ by a second digital word representing said normalized clock frequency $F_i$ to create a third digital word representing a normalized transition detection value $P'_i = P_i F_i$;

phase error correction means coupled to said first multiplier means for adding said third digital word $P'_i$ to a fourth digital word representing a once-delayed value of a weighted phase error $aE'_{i-1}$ to create a fifth digital word representing a corrected transition detection value $Z'_i = P'_i + aE'_{i-1}$, said fifth digital word having a rounded integral value representing an $i^{th}$ said datum $D_i = RND(Z'_i)$, wherein the fractional difference between said fifth digital word and said rounded integral value represents a normalized phase error $E'_i = Z'_i - D_i$ of said normalized transition detection value $P'_i$; and output means coupled to said phase error correction means for rounding said fifth digital word $Z'_i$ to create said datum $D_i = RND(Z'_i)$ and for presenting said datum $D_i$ to said output bus means.

2. The DASD clock controller of claim 1 wherein said phase error correction means further comprises:

first register means for storing said fractional difference $E'_i = Z'_i - D_i$ of said fifth digital word $Z'_i$;

first delay means coupled to said first register means for storing a once delayed said fractional difference representing a once-delayed value for said estimated normalized error $E_{i-1}'$ of an earlier said fifth digital word $Z_{i-1}'$; and second multiplier means coupled to said first delay means for multiplying said once-delayed fractional difference $E_{i-1}'$ by a first digital constant (a) to generate said fourth digital word representing said weighted normalized phase error $aE'_{i-1}$.

3. The DASD clock controller of claim 2 further comprising:

second register means for storing an earlier said second digital word representing a once-delayed said normalized clock frequency $F_{i-1}$; and third multiplier means coupled to said second register means for multiplying said stored second digital word $F_{i-1}$ by a sixth digital word representing a two-parameter weighted frequency error $(1-bE'_i)$ to create said second digital word representing said normalized clock frequency $F_i = (1-bE'_i)F_{i-1}$.

4. The DASD clock controller of claim 2 further comprising:

second register means for storing an earlier said second 4 digital word representing a once-delayed said normalized clock frequency $F_{i-1}$; and third multiplier means coupled to said second register means for multiplying said stored second digital word $F_{i-1}$ by a sixth digital word representing a three-parameter weighted frequency error $[1-b(E'_i + aE_{i-1}')]$ to create said second digital word representing said normalized clock frequency $F_i = [1-b(E'_i + aE'_{i-1})]F_{i-1}$.

5. The DASD clock controller of claim 1 further comprising:

register means for storing an earlier said second digital word representing a once-delayed said normalized clock frequency $F_{i-1}$; and second multiplier means coupled to said register means for multiplying said stored second digital word $F_{i-1}$ by a sixth digital word representing a two-parameter weighted frequency error $(1-bE'_i)$ to create said second digital word representing said normalized clock frequency $F_i = (1-bE'_i)F_{i-1}$.

6. The DASD clock controller of claim 1 further comprising:

register means for storing an earlier said second digital word representing of a once-delayed said normalized clock frequency $F_{i-1}$; and second multiplier means coupled to said register means for multiplying said stored second digital word $F_{i-1}$ by a sixth digital word representing a three-parameter weighted frequency error $[1-b(E'_i + aE'_{i-1})]$ to create said second digital word representing said normalized clock frequency $F_i = [1-b(E'_i + aE'_{i-1})]F_{i-1}$.

7. In an optical data storage device having a recording channel for recovering data (D) stored as a plurality of signal transitions in said optical data storage device, an asynchronous discrete clock controller having an asynchronous sampling clock frequency $F_s$, where a normalized clock frequency $F_i$ is defined as the ratio of a synchronous data clock frequency $F_d$ to said sampling clock frequency $F_s$, where i is a non-zero positive integer and $0 \leq a, b \leq 1$, said clock controller comprising:

output bus means for delivering said recovered data (D);

input means for receiving a first digital word representing the detection time $P_i$ of an $i^{th}$ said signal transition;

first multiplier means coupled to said input means for multiplying said first digital word $P_i$ by a second digital word representing said normalized clock frequency $F_i$ to create a third digital word representing a normalized transition detection value $P'_i = P_i F_i$;

phase error correction means coupled to said first multiplier means for adding said third digital word $P'_i$ to a fourth digital word representing a once-delayed value of a weighted phase error $aE'_{i-1}$ to create a fifth digital word representing a corrected transition detection value $Z'_i = P'_i + aE'_{i-1}$, said fifth digital word having a rounded integral value representing an $i^{th}$ said datum $D_i = RND(Z'_i)$, wherein the fractional difference between said fifth digital word and said rounded integral value represents a normalized phase error $E'_i = Z'_i - D_i$ of said normalized transition detection value $P_i$; and output means coupled to said phase error correction means for rounding said fifth digital word $Z'_i$ to create said datum $D_i = RND(Z'_i)$ and for presenting said datum $D_i$ to said output bus means.

8. The optical data storage device clock controller of claim 7 further comprising:

first register means for storing said fractional difference $E'_i = Z'_i - D_i$ of said fifth digital word $Z'_i$;

first delay means coupled to said first register means for storing a once-delayed said fractional difference representing a once-delayed value for said estimated normalized error $E'_{i-1}$ of an earlier said fifth digital word $Z'_{i-1}$; and second multiplier means coupled to said first, delay means for multiplying said once-delayed fractional difference $E'_{i-1}$ by a first digital constant (a) to generate said fourth digital word representing said weighted normalized phase error $aE'_{i-1}$.

9. The optical data storage device clock controller of claim 4 further comprising:

second register means for storing an earlier said second digital word representing a once-delayed said normalized clock frequency $F_{i-1}$; and third multiplier means coupled to said second register means for multiplying said stored second digital word $F_{i-1}$ by a sixth digital word representing a two-parameter weighted frequency error $(1-bE'_i)$ to create said second digital word representing said normalized clock frequency $F_i = (1-bE'_i)F_{i-1}$.

10. The optical data storage device clock controller of claim 8 further comprising:

second register means for storing an earlier said second digital word representing a once-delayed said normalized clock frequency $F_{i-1}$; and third multiplier means coupled to said second register means for multiplying said stored second digital word $F_{i-1}$ by a sixth digital word representing a three-parameter weighted frequency error $[1-b(E'_i + aE'_{i-1})]$ to create said second digital word representing said normalized clock frequency $F_i = [1-b(E'_i + aE'_{i-1})]F_{i-1}$.

11. The optical data storage device clock controller of claim 1 further comprising:

register means for storing an earlier said second digital word representing a once-delayed said normalized clock frequency $F_{i-1}$; and second multiplier means coupled to said register means for multiplying said stored second digital word $F_{i-1}$ by a sixth digital word representing a two-parameter weighted frequency error $(1-bE'_i)$ to create said second digital word representing said normalized clock frequency $F_i=(1-bE'_i)F_{i-1}$.

12. The optical data storage device clock controller of claim 7 further comprising:

register means for storing an earlier said second digital word representing of a once-delayed said normalized clock frequency $F_{i-1}$; and second multiplier means coupled to said register means for multiplying said stored second digital word $F_{i-1}$ by a sixth digital word representing a three-parameter weighted frequency error $[1-b(E'_i+aE'_{i-1})]$ to create said second digital word representing said normalized clock frequency $F_i=[1-b(E'_i+aE'_{i-1})]F_{i-1}$.

13. In a data storage tape drive having a recording channel for recovering data (D) stored as a plurality of signal transitions in said tape drive media, an asynchronous discrete clock controller having an asynchronous sampling clock frequency $F_s$, where a normalized clock frequency $F_i$ is defined as the ratio of a synchronous data clock frequency $F_d$ to said sampling clock frequency $F_s$, where i is a non-zero positive integer and $0 \leq a,b \leq 1$, said clock controller comprising:

output bus means for delivering said recovered data (D);

input means for receiving a first digital word representing the detection time $P_i$ of an $i^{th}$ said signal transition;

first multiplier means coupled to said input means for multiplying said first digital word $P_i$ by a second digital word representing said normalized clock frequency $F_i$ to create a third digital word representing a normalized transition detection value $P'_i=P_iF_i$;

phase error correction means coupled to said first multiplier means for adding said third digital word $P'_i$ to a fourth digital word representing a once-delayed value of a weighted phase error $aE'_{i-1}$ to create a fifth digital word representing a corrected transition detection value $Z'_i=P'_i+aE'_{i-1}$, said fifth digital word having a rounded integral value representing an $i^{th}$ said datum $D_i=RND(Z'_i)$, wherein the fractional difference between said fifth digital word and said rounded integral value represents a normalized phase error $E'_i=Z'_i-D_i$ of said normalized transition detection value $P_i$; and output means coupled to said phase error correction means for rounding said fifth digital word $Z'_i$ to create said datum $D_i=RND(Z'_i)$ and for presenting said datum $D_i$ to said output bus means.

14. The optical data storage device clock controller of claim 13 further comprising:

first register means for storing said fractional difference $E'_i=Z'_i-D_i$ of said fifth digital word $Z'_i$;

first delay means coupled to said first register means for storing a once-delayed said fractional difference representing a once-delayed value for said estimated normalized error $E'_{i-1}$ of an earlier said fifth digital word $Z'_{i-1}$; and second multiplier means coupled to said first delay means for multiplying said once-delayed fractional difference $E'_{i-1}$ by a first digital constant (a) to generate said fourth digital word representing said weighted normalized phase error $aE'_{i-1}$.

15. The optical data storage device clock controller of claim 14 further comprising:

second register means for storing an earlier said second digital word representing a once-delayed said normalized clock frequency $F_{i-1}$; and third multiplier means coupled to said second register means for multiplying said stored second digital word $F_{i-1}$ by a sixth digital word representing a two-parameter weighted frequency error $(1-bE'_i)$ to create said second digital word representing said normalized clock frequency $F_i=(1-bE'_i)F_{i-1}$.

16. The optical data storage device clock controller of claim 14 further comprising:

second register means for storing an earlier said second digital word representing a once-delayed said normalized clock frequency $F_{i-1}$; and third multiplier means coupled to said second register means for multiplying said stored second digital word $F_{i-1}$ by a sixth digital word representing a three-parameter weighted frequency error $[1-b(E'_i+aE'_{i-1})]$ to create said second digital word representing said normalized clock frequency $F_i=[1-b(E'_i+aE'_{i-1})]F_{i-1}$.

17. The optical data storage device clock controller of claim 13 further comprising:

register means for storing an earlier said second digital word representing a once-delayed said normalized clock frequency $F_{i-1}$; and second multiplier means coupled to said register means for multiplying said stored second digital word $F_{i-1}$ by a sixth digital word representing a two-parameter weighted frequency $(1-bE'_i)$ to create said second digital word representing said normalized clock frequency $F_i=(1-bE'_i)F_{i-1}$.

18. The optical data storage device clock controller of claim 13 further comprising:

register means for storing an earlier said second digital word representing a once-delayed said normalized clock frequency $F_{i-1}$; and second multiplier means coupled to said register means for multiplying said stored second digital word $F_{i-1}$ by a sixth digital word representing a three-parameter weighted frequency error $[1-b(E'_i+aE'_{i-1})]$ to create said second digital word representing said normalized clock frequency $F_i=[1-b(E'_i+aE'_{i-1})]F_{i-1}$.

* * * * *

UNITED STATES PATENT AND TRADEMARK OFFICE
CERTIFICATE OF CORRECTION

PATENT NO. : 5,295,128
DATED : March 15, 1994
INVENTOR(S) : Hutchins et al

It is certified that error appears in the above-indentified patent and that said Letters Patent is hereby corrected as shown below:

Col. 12, lines 30 and 39, please replace "(D)" with -- $\{D\}$ --.

Col. 13, lines 4, 8, and 31, please replace "$E_{i-1}$!" with --$E'_{i-1}$--.

Col. 13, line 5, please replace "$Z_{i-1}$" with --$Z'_{i-1}$--.

Col. 13, lines 58 and 67, please replace "(D)" with -- $\{D\}$ --.

Col. 14, line 41, please replace "Claim 4" with --Claim 8--.

Col. 14, line 64, please replace "Claim 1" with --Claim 7--.

Col. 15, lines 20 and 29, please replace "(D)" with -- $\{D\}$ --.

Signed and Sealed this

Ninth Day of August, 1994

BRUCE LEHMAN

Attest:

Attesting Officer

Commissioner of Patents and Trademarks